United States Patent [19]

Kappenhagen

[11] 3,875,458
[45] Apr. 1, 1975

[54] DIMMER FOR DISCHARGE LAMP UTILIZING A PULSE ENABLING CIRCUIT

[75] Inventor: George A. Kappenhagen, Mechanicsburg, Pa.

[73] Assignee: Westinghouse Electric Corporation, Pittsburgh, Pa.

[22] Filed: June 10, 1974

[21] Appl. No.: 478,137

[52] U.S. Cl................ 315/194, 315/199, 315/291, 315/307, 315/DIG. 4
[51] Int. Cl........................ H05b 41/16, G05f 1/08
[58] Field of Search........ 315/194, 199, 200 R, 208, 315/209 R, 291, 307, 324, DIG. 4

[56] References Cited
UNITED STATES PATENTS

| | | | |
|---|---|---|---|
| 3,344,311 | 9/1967 | Nuckolls | 315/199 |
| 3,684,919 | 12/1970 | Cramer | 315/194 |
| 3,821,609 | 6/1974 | Kappenhagen et al. | 315/291 X |

Primary Examiner—Rudolph V. Rolinec
Assistant Examiner—E. R. LaRoche
Attorney, Agent, or Firm—R. A. Stoltz

[57] ABSTRACT

A lighting control apparatus (dimmer) responsive to an electrical demand signal to control the portion of the voltage cycle during which voltage is supplied to one or more discharge lamps from AC voltage source, using a pulse enable circuit to provide pulsing of the firing circuit appropriate for discharge lamps. The apparatus comprises a shaping circuit responsive to a demand signal, a timing circuit, a pulse enable circuit, a single pulse per half-cycle firing means, and a solid state switching means. The pulse enable circuit prevents activation of the firing means when the solid state switching means is in a conductive state (firing pulses based on the voltage cycle could otherwise occur before the lagging current of the previous half has fallen to zero). This combines the advantages of low power consumption of single pulse firing circuits with a reliability of firing of discharge lamps obtained heretofore only in multiple pulse firing circuits.

3 Claims, 5 Drawing Figures

DIMMER FOR DISCHARGE LAMP UTILIZING A PULSE ENABLING CIRCUIT

CROSS-REFERENCE TO RELATED APPLICATION

In copending application Ser. No. 478,138, filed by the same inventor and owned by the same assignee, is described a dimmer utilizing an output synthesis circuit which provides a waveform having the same wave shape and proportional in magnitude to the voltage which is transmitted to the load. The output synthesis circuit provides the same function as a feedback transformer, but at lower cost.

BACKGROUND OF THE INVENTION

The instant invention relates to lighting systems which control the level of illumination of one or more lamps, such as in a stage lighting system, and more particularly to electronic dimmers which control the flow of power to discharge lamps.

Most electronic dimmers are designed for and used with an incandescent lamp load and use timing circuits referenced from the 60 cycle line (supply) voltage. One such dimmer is described in Ser. No. 370,134, filed June 13, 1973 by Kappenhagen and Tabor, now Pat. No. 3,821,601. While such dimmers can also control a load consisting of a discharge lamp in series with a ballast over a portion of the range, difficulties are encountered at demands for near full brightness. The ballast, discharge lamp combination is an inductive load and the current zero generally occurs considerably after the reversal of the 60-cycle supply voltage. As an early single firing pulse (occurring after the voltage reversal but before the current reversal) will be ineffective, no power will be supplied during that half cycle. Thus, such a dimmer might work well at low power demands but cause flashing of the discharge lamps at demands for high lighting level (due to the firing of the solid state switching means only on alternate half cycles). One method of avoiding the foregoing difficulty is to provide for multiple firing pulses during each half cycle. Such multiple pulse firing circuits, however, require higher power rating devices in the firing circuits (which are therefore more expensive) and also result in essentially random variations in the timing of the firing. The firing is essentially random, as any attempted early firing, results in actual firing, not as soon as the solid state switching device stops conducting, but at some later time which is dependent on the frequency of pulsing and exactly where in the multiple pulse cycle the soild state switching means stops conducting. The random timing variations are especially troublesome in regulated circuits as the feedback of the regulated circuit is continually attempting to correct for these random variations and this "correction" may be in the wrong direction.

SUMMARY OF THE INVENTION

It has been discovered that the foregoing disadvantages of the prior art can be avoided by using a pulse enable circuit which prevents the activation of the firing means when the solid state switching means is in a conductive state.

The lighting control apparatus of the instant invention is responsive to an electric command signal to control the portion of the voltage cycle during which voltage from an AC voltage source is supplied to a discharge lamp load (the load comprising one or more discharge lamps and one or more ballasts). This apparatus comprises a solid state switching means, a single pulse per half cycle firing means, a pulse enable circuit, a timing circuit, and a shaping circuit. The solid state switching means has gating means and two power terminals, these power terminals being connected in series with the load across the AC voltage source. The single pulse per half cycle firing means has an output connected to the gating means of the solid state switching means and the firing means renders the solid state switching means conductive when the firing means is initiated. The pulse enable circuit has an output connected to the firing means and the pulse enable circuit senses the status of (preferably from the voltage across) the solid state switching means and prevents the activation of the firing means when the solid state switching means is in a conductive state. The timing circuit has an output connected to the pulse enable circuit and the timing circuit generates the signal, which, when coupled to the firing means (by the pulse enable circuit) initiates the firing means to render the solid state switching means conductive during the remainder of the half cycle (that is, at least until the AC voltage source falls to zero and generally somewhat longer, the current not falling to zero until later in the inductive load). The shaping circuit has an output electrically connected to the timing circuit and the shaping circuit is adapted to receive a demand signal and to generate an output signal which is a function of the demand signal.

BRIEF DESCRIPTION OF THE DRAWINGS

The invention can be best understood by reference to the following drawings, in which.

DESCRIPTION OF THE PREFERRED EMBODIMENTS

Figure 1:
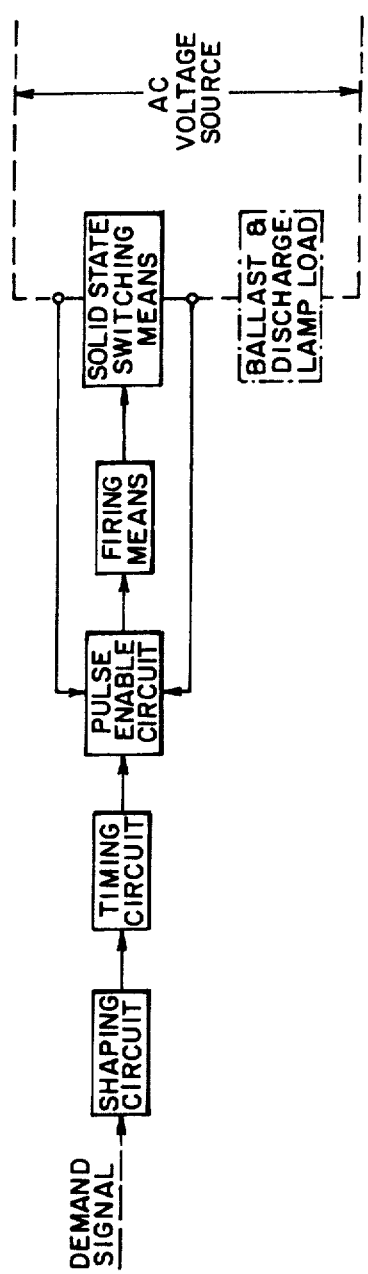
FIG. 1 is a block diagram showing the interrelationship between the essential elements of the instant invention.

The block diagram of FIG. 1 shows the basic elements of the lighting control apparatus for the control of a discharge lamp load. An external demand signal is introduced into the shaping circuit. The shaping circuit transforms the demand signal (which is typically directly proportional to the desired apparent luminous intensity) into a signal which is a function of the appropriate lamp votage to produce that luminous intensity. Typically, this shaping is done to compensate both the eye response (approximately a square root function) and for the relationship between load voltage and luminous intensity for the particular lamp type.

The shaped signal is sent to the timing circuit. The timing circuit provides the proper relationship between the firing pulse and the phase of the AC voltage source such that the solid state switching means will conduct for an appropriate fraction of the half cycle.

The pulse enable circuit senses the status of the solid state switching means (the solid state switching means is typically 2 SCR's or a triac) and prevents firing of the firing means when the solid state switching means is in a conductive state. The pulse enable circuit can be of a type which senses the current through the solid state switching means, as current through the solid state switching means indicates that the solid state switching means is in a conductive state. The pulse enable circuit can also be of a type which analyzes the magnitude of the voltage across the solid state switching means. It will be noted that neither zero source voltage nor the presence of voltage across the solid state switching means is an absolute indicia of a non-conductive state of the solid state switching means. With an inductive load such as the ballast and discharge lamp load combination, zero voltage of the voltage source does not necessarily mean that the solid state switching means is non-conductive. In addition, because of the forward drop, some voltage will normally appear across a conducting solid state switching means. Thus a voltage sensing type pulse enable circuit cannot rely on source voltage or the mere presence of voltage across the solid state switching means, but must analyze the magnitude of voltage across the solid state switching means (a relative large voltage indicating that the solid state switching means is non-conductive).

The output of the pulse enable circuit goes to the firing means. When the timing circuit has called for a firing pulse and the pulse enable circuit has determined that the solid state switching means is non-conductive, the firing means is initiated and a firing pulse is sent to the solid state switching means, rendering the solid state switching means conductive for at least the remainder of that half cycle of the AC voltage source (again, because of the lagging current in the inductive circuit, the solid state switching means will remain conductive slightly longer than the remainder of that particular half cycle of voltage). As the initiation of the firing means requires both the proper indication from the pulse enable circuit and the signal from the timing circuit, the single pulse per half cycle firing means will be initiated when the second of these circuits (the timing circuit and the pulse enable circuit) indicate that the firing is appropriate.

Figure 2:
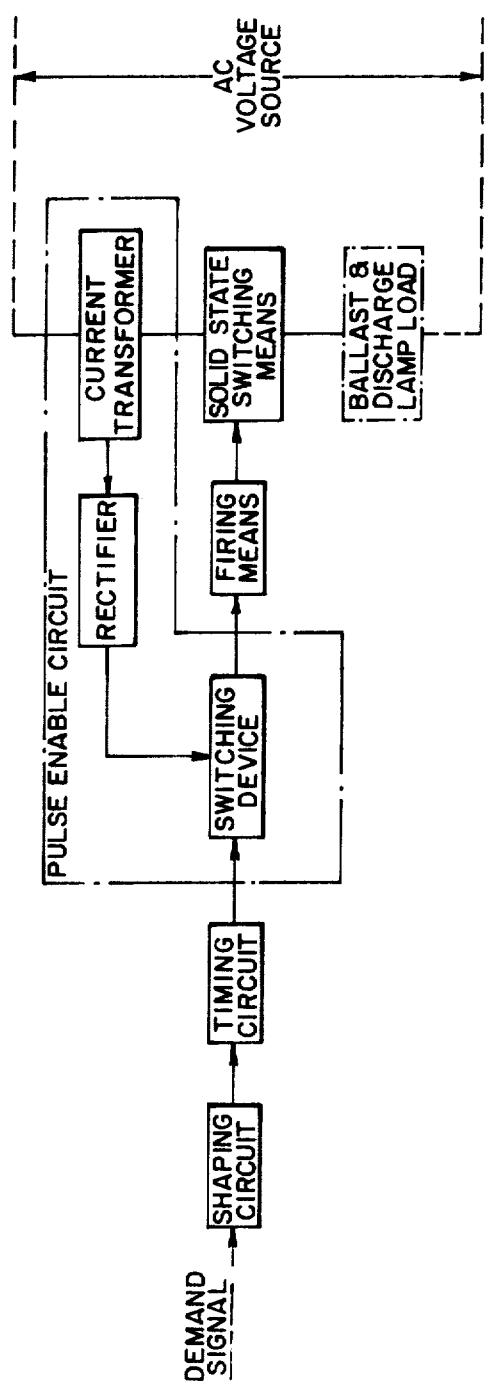
FIG. 2 is a block diagram of a preferred configuration, showing the relationship of elements of one type of pulse enable circuit.

FIG. 2 is a block diagram showing one configuration of pulse enable circuit. In this configuration a current transformer senses the current to the solid state switching means. The output signal from the current transformer is rectified and used to control a switching device such that no signal is coupled from the timing circuit to the firing means until the current to the solid state switching means has dropped to zero (it will be noted that some circuits require an initial pulse to start operating). One alternate method to produce the current signal is to integrate the voltage across the series inductor.

Figure 3:
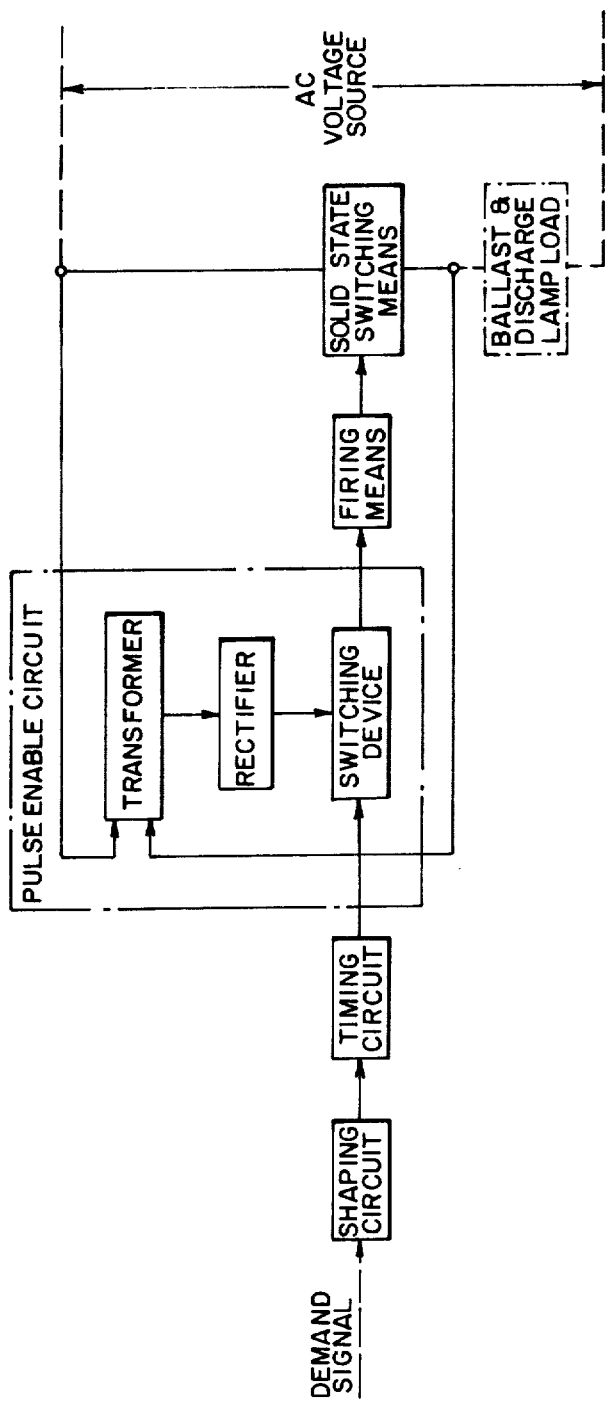
FIG. 3 is a block diagram of a preferred configuration showing elements of an alternate type of pulse enable circuit.

FIG. 3 is a block diagram of an alternate configuration of pulse enable circuit. This configuration measures the voltage across the solid state switching means and analyzes the magnitude of the voltage to determine whether or not the solid state switching means is conductive. A transformer is connected with its primary across the power terminals of the solid state switching means and its secondary to the input of a rectifier (preferably a rectifier bridge). The rectifier output is analyzed and, if above a predetermined minimum, the signal terminal of a switching device is initiated. The input terminal of the switching device is connected to the timing circuit and output terminal of the switching device provides the output terminal of the pulse enable circuit. The voltage drop across the solid state switching means when the solid state switching means is conductive is generally less than 10 volts while the voltage across the solid state switching means immediately after current reversal is typically quite high (when the current lags by 30°, for example, the voltage across the solid state switching means immediately after the current has gone to zero and the solid state switching means has become nonconductive is approximately 150 volts). Thus the minimum voltage to indicate non-conducting can be set anywhere between about 10 volts and about 100 volts. In such a circuit, a capacitor can be used to allow firing late in the half cycle by delaying the time at which the voltage being compared drops below the minimum (below which the pulse enable circuit would block the timing circuit signal). It should be noted, however, that a discharge lamp will not operate satisfactorily at very low powers and that there is no need to have the pulse enable circuit conduct a firing pulse during the last 10° or 15° of the voltage half cycle.

Figure 4:
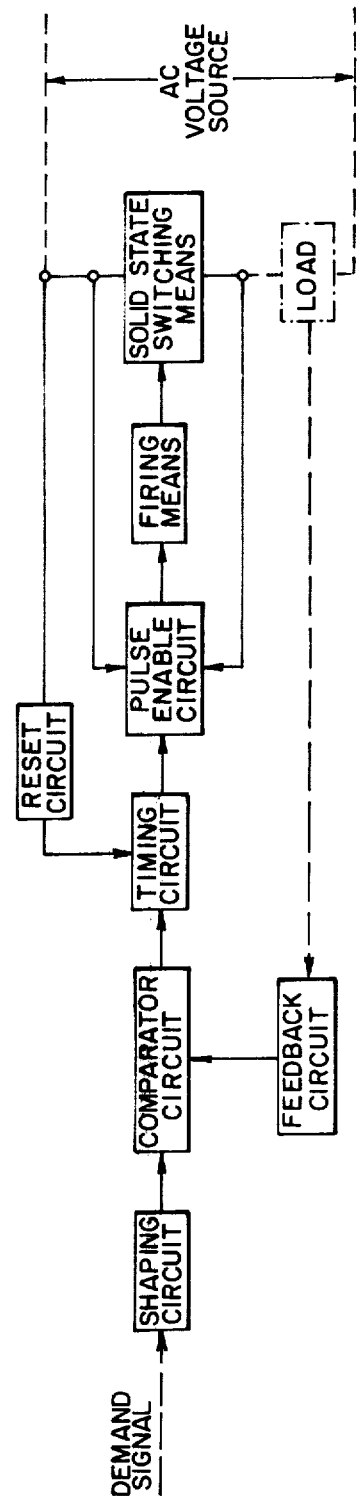
FIG. 4 is a block diagram of a preferred configuration, showing additional elements which are preferably included.

FIG. 4 is a block diagram showing additional elements which can be used in a lighting control apparatus for a discharge lamp load. In this circuit there is also shown a feedback circuit which measures some load parameter (such as current, but more typically voltage) which parameter is fed back to a comparator circuit which generates a signal to the timing circuit based on a comparison between the shaping circuit output and the feedback circuit output. A reset circuit having an output connected to the timing circuit is also provided. The reset circuit periodically initializes conditions in the timing circuit. Preferably the timing circuit generates a ramp of voltage (the slope of the ramp being adjusted by the output of the comparator circuit) and the reset circuit initializes the ramp to a predetermined value, possibly when the solid state switching means is fired, but preferably when the AC voltage source passes through zero. The operation of the reset and comparator circuits is similar to that described in the aforementioned Pat. No. 3,821,601.

Figure 5:
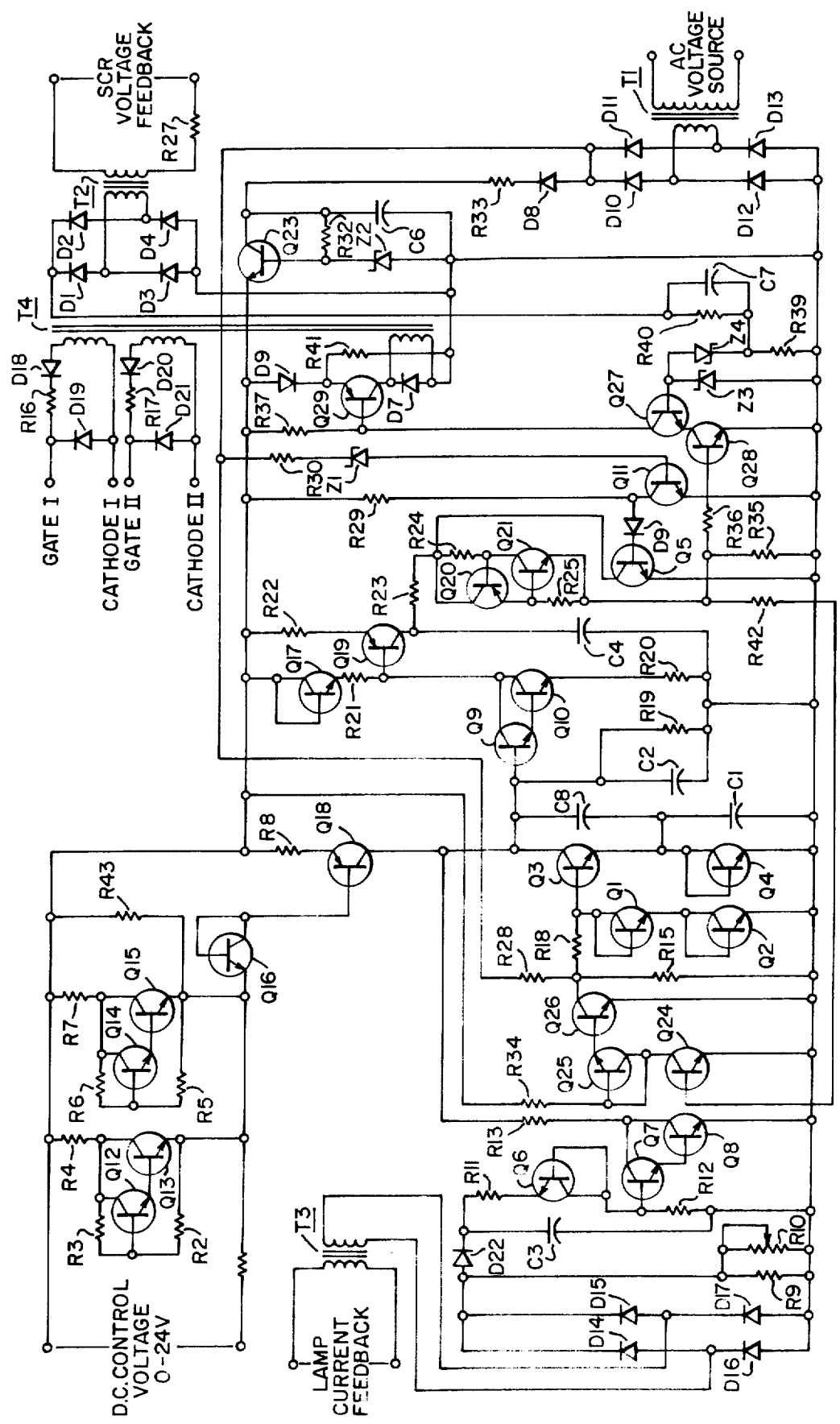
FIG. 5 is a detailed circuit diagram of a preferred configuration.

FIG. 5 is a detailed circuit diagram of a lighting control apparatus illustrative of the instant invention (the block diagram of FIG. 4 is generally applicable to FIG. 5). Table 1 is a component listing for this circuit:

TABLE 1

| Reference Identification | Component Value |
| --- | --- |
| R1, R3, R16, R33 | 10k at ¼ watt |
| R2, R25 | 160k at ¼ watt |
| R4 | 1.8 meg at ¼ watt |
| R5 | 620k at ¼ watt |
| R6, R21 | 8.2k at ¼ watt |
| R7 | 560k at ¼ watt |
| R8 | 470k at ¼ watt |
| R9, R34, R43 | 100k at ¼ watt |
| R10, R35 | 20k at ¼ watt |
| R11 | 1.6 meg at ¼ watt |
| R12, R24 | 30k at ¼ watt |
| R13 | 3k at ¼ watt |
| R14 | 620 ohm at ¼ watt |
| R15, R32, R41 | 27k at ¼ watt |
| R17 | 200 ohm pot |

TABLE 1-Continued

| Reference Identification | Component Value |
|---|---|
| R18 | 50k ohm pot |
| R19 | 82 ohm at ¼ watt |
| R20, R29 | 330 ohm at ¼ watt |
| R22, R23, R28 | 4.7k at ¼ watt |
| R27, R36, R42 | 1.5k at ¼ watt |
| R26 | 74 ohm at ¼ watt |
| R40 | 47k at ¼ watt |
| R30 | 43k at ¼ watt |
| R31 | 1 meg at ¼ watt |
| R37, R38 | 1k at ¼ watt |
| R39 | 15k |
| C1 | 0.68 ufd at 100 volts |
| C2 | 5.0 ufd at 50 volts |
| C3 | 0.15 ufd at 100 volts |
| C4 | 0.33 ufd at 100 volts |
| C5 | 125 ufd at 50 volts |
| C7 | WMF .0056 — 200 |
| D1 through D4 | 1N4148 |
| D5 through D13 | 1N457A |
| D14 through D22 | 1N645A |
| Q1 through Q6 | on single chip Silicon General SG3823 |
| Q12 through Q17 | on single chip Silicon General SG3823 |
| Q7 through Q11 | on single chip Silicon General SG3821 |
| Q18, Q19, Q20 | 2N2905A |
| Q21, Q22 | 2N711 |
| T1 | Stancor P-8394 |
| T2, T3 | Stancor P-8610 |
| T4 | Sprague 11 Z 2100 1:1:1 |
| Z1 | 1N756A |
| Z2 | 1N968B |
| Z3 | ¼ M 4.7A Z 5 |
| Z4 | 1N957B |
| Reactor | 0.71 millihenry choke |

TABLE 1

| Reference Identification | Component Value |
|---|---|
| R1, R3, R16, R33 | 10k at ¼ watt |
| R2, R25 | 160k at ¼ watt |
| R4 | 1.8 meg at ¼ watt |
| R5 | 620k at ¼ watt |
| R6, R21 | 8.2k at ¼ watt |
| R7 | 560k at ¼ watt |
| R8 | 470k at ¼ watt |
| R9, R34, R43 | 100k at ¼ watt |
| R10, R35 | 20k at ¼ watt |
| R11 | 1.6 meg at ¼ watt |
| R12, R24 | 30k at ¼ watt |
| R13 | 3k at ¼ watt |
| R14 | 620 ohm at ¼ watt |
| R15, R32, R41 | 27k at ¼ watt |
| R17 | 200 ohm pot |
| R18 | 50k ohm pot |
| R19 | 82 ohm at ¼ watt |
| R20, R29 | 330 ohm at ¼ watt |
| R22, R23, R28 | 4.7k at ¼ watt |
| R27, R36, R42 | 1.5k at ¼ watt |
| R26 | 74 ohm at ¼ watt |
| R40 | 47k at ¼ watt |
| R30 | 43k at ¼ watt |
| R31 | 1 meg at ¼ watt |
| R37, R38 | 1k at ¼ watt |
| R39 | 15k |
| C1 | 0.68 ufd at 100 volts |
| C2 | 5.0 ufd at 50 volts |
| C3 | 0.15 ufd at 100 volts |
| C4 | 0.33 ufd at 100 volts |
| C5 | 125 ufd at 50 volts |
| C7 | WMF .0056 — 200 |
| D1 through D4 | 1N4148 |
| D5 through D13 | 1N457A |
| D14 through D22 | 1N645A |
| Q1 through Q6 | on single chip Silicon General SG3823 |
| Q12 through Q17 | on single chip Silicon General SG3823 |
| Q7 through Q11 | on single chip Silicon General SG3821 |
| Q18, Q19, Q20 | 2N2905A |
| Q21, Q22 | 2N711 |

TABLE 1-Continued

| Reference Identification | Component Value |
|---|---|
| T1 | Stancor P-8394 |
| T2, T3 | Stancor P-8610 |
| T4 | Sprague 11 Z 2100 1:1:1 |
| Z1 | 1N756A |
| Z2 | 1N968B |
| Z3 | ¼ M 4.7A Z 5 |
| Z4 | 1N957B |
| Reactor | 0.71 millihenry choke |

FIG. 5 is illustrative of a circuit in which the voltage across the solid state switching means is used to determine the status of the solid state switching means. R27 is connected in series with one winding (the primary) of T2 and this series combination is placed directly across the solid state switching means. Diodes D1 through D4 rectify the output signal from the secondary of T2. This signal is divided by R39 and R40 and applied to the base of Q27. When the conduction voltage of Z4 is reached, Z3 clamps the base of Q27 to less than its rated base-emitter voltage. Q28 is conductive when the timing circuit is in a firing initiating condition. As soon as both Q27 and Q28 are in the conductive state, the firing pulse is initiated. C7 is used to broaden the time which Q27 is conductive, such that the firing pulse can be initiated during the latter portion of the voltage half cycle.

While the invention has been explained by describing particular embodiments thereof, it will be apparent to those skilled in the art that modifications may be made without departing from the scope of the invention.

What is claimed is:

1. A lighting control apparatus responsive to an electrical demand signal to control the portion of each half cycle during which voltage is supplied to a discharge lamp load from an AC voltage source, said apparatus comprising:

a. solid state switching means having gating means and two power terminals, said power terminals being adapted to be connected in series with said load across said AC voltage source;

b. a single pulse per half cycle firing means having an output connected to said gating means of said solid state switching means, which firing means renders said solid state switching means conductive when said firing means is initiated;

c. a pulse enable circuit means having an output connected to said firing means, for sensing the status of said solid state switching means and preventing the activation of said firing means when said solid state switching means is in a conductive state;

d. a timing circuit having an output connected to said pulse enable circuit means, said timing circuit generating a signal, which, when coupled through to the firing means by said pulse enable circuit means, will initiate the firing means to render the solid state switching means conductive; and e. a shaping circuit having an output electrically connected to said timing circuit, said shaping circuit being adapted to receive said demand signal and to generate an output signal which is a function of said demand signal.

2. The apparatus of claim 1, wherein said pulse enable circuit means comprises:

a. a transformer having a primary and a secondary, said primary being connected across said power terminals of said solid state switching means;
b. a rectifier having an input and an output, said input being connected to said secondary of said transformer; and
c. a switching device having an input terminal, an output terminal and a signal terminal, said signal terminal being connected to said rectifier output, said output terminal providing the output of said pulse enable circuit means, and said input terminal being connected to said output of said timing circuit, the rectified signal from said transformer being effective to turn said switching device on when there is voltage across said solid state switching means indicative of said solid state switching means being non-conductive.

3. The apparatus of claim 2, wherein a reset circuit having an output connected to said timing circuit is included, said reset circuit monitoring the voltage of said AC voltage source and initializing said timing circuit each time said voltage passes through zero.

* * * * *